(12) United States Patent
Takumori

(10) Patent No.: US 7,921,745 B2
(45) Date of Patent: Apr. 12, 2011

(54) RESIN GEAR

(75) Inventor: Toru Takumori, Kawaguchi (JP)

(73) Assignee: Enplas Corporation, Saitama (JP)

( * ) Notice: Subject to any disclaimer, the term of this patent is extended or adjusted under 35 U.S.C. 154(b) by 343 days.

(21) Appl. No.: 12/077,343

(22) Filed: Mar. 19, 2008

(65) Prior Publication Data

US 2008/0236320 A1 Oct. 2, 2008

(30) Foreign Application Priority Data

Mar. 26, 2007 (JP) .................................. 2007-079103

(51) Int. Cl.
*F16H 55/00* (2006.01)
(52) U.S. Cl. ......................................................... 74/462
(58) Field of Classification Search ............. 74/DIG. 10, 74/457, 460, 461, 462; 474/152, 161
See application file for complete search history.

(56) References Cited

U.S. PATENT DOCUMENTS

| | | | | | |
|---|---|---|---|---|---|
| 2,682,760 | A | * | 7/1954 | Shenk ........................... | 464/154 |
| 3,043,158 | A | * | 7/1962 | Herr, Jr. ......................... | 74/462 |
| 3,457,234 | A | * | 7/1969 | Gianatasio ..................... | 528/63 |
| 3,881,365 | A | * | 5/1975 | Hardy ............................ | 74/462 |
| 5,315,790 | A | * | 5/1994 | Kish et al. .......................... | 451/5 |
| 5,802,921 | A | * | 9/1998 | Rouverol ........................ | 74/458 |
| 6,253,047 | B1 | * | 6/2001 | Hildebrand et al. ........... | 399/167 |
| 2007/0017314 | A1 | * | 1/2007 | Konishi ........................... | 74/462 |
| 2007/0137355 | A1 | * | 6/2007 | Ohmi et al. ...................... | 74/462 |
| 2008/0229858 | A1 | * | 9/2008 | Takumori ........................ | 74/458 |
| 2008/0276742 | A1 | * | 11/2008 | Hagihara ......................... | 74/458 |
| 2008/0302198 | A1 | * | 12/2008 | Takumori ........................ | 74/457 |

FOREIGN PATENT DOCUMENTS

JP 08-312755 11/1996

* cited by examiner

*Primary Examiner* — Vicky A Johnson
(74) *Attorney, Agent, or Firm* — DLA Piper LLP (US)

(57) ABSTRACT

Noise can be effectively reduced without rotative power transmission accuracy being compromised.

In a tooth 2 of a resin gear 1, a tooth face that is a predetermined area from a tooth crest 8 towards a tooth root 10 side serves as a tooth profile modification area 11. A tooth surface excluding the tooth profile modification area 11 serves as an involute profile area 12. The tooth profile modification area 11 includes a linear standard profile portion 14 formed by an involute curved line from the tooth crest 8 of the tooth towards the tooth root 10 side and a profile modification portion 16 in which a tooth thickness gradually and smoothly decreases from the standard profile portion 14 along a tooth width direction and the tooth thickness gradually and smoothly decreases from a tooth root end side 15 towards the tooth crest 8. In the tooth profile modification area 11, a contacting section becomes elastically deformed as a result of the resin gear coming into contact with a meshing mating gear. A tooth width direction length of the contact surface gradually increases from a minute, point-like width to a full tooth width from the tooth crest 8 side towards the tooth root 10 side.

2 Claims, 15 Drawing Sheets

(a)

RESIN GEAR

BACKGROUND OF THE INVENTION

1. Field of the Invention

The present invention relates to a resin gear that transmits rotative power.

2. Description of the Related Art

Conventionally, a following resin spur gear 106 configured to reduce rotation transmission error and noise is known (refer to Patent Literature 1). As shown in FIG. 16 and FIG. 17, a tooth surface 103 of a two-pair meshing area 102 on a tooth crest 101 side is cut such that a rigidity of a tooth 104 in the two-pair meshing area 102 on the tooth crest side 101 is less than a rigidity of a tooth on a standard involute spur gear (referred to, hereinafter, as a spur gear). Difference between an amount of deformation in a one-pair meshing area 105 of the tooth 104 and an amount of deformation in the two-pair meshing area 102 of the tooth 104 is reduced. Patent Literature 1: Japanese Patent Laid-open Publication No. Heisei 8-312755 (refer, in particular, to FIG. 1 to FIG. 3).

However, when the conventional resin spur gear 106 shown in FIG. 16 and FIG. 17 is used on a driven side, when the resin spur gear 106 and a driving side gear start to mesh, an entire area of the tooth crest 101 in a tooth width direction collides with a tooth root side of a mating gear (driving side gear). Noise resulting from a collision sound between the teeth on the driven side and the teeth on the driving side cannot be sufficiently reduced.

When the conventional resin spur gear 106 shown in FIG. 16 and FIG. 17 is used on the driving side, sliding occurs between the entire area of the tooth crest 101 in the tooth width direction and a tooth surface of the mating gear when the meshing between the resin spur gear 106 and the tooth on the mating gear is released. Generally, a sliding speed of the tooth surface of the spur gear is fastest on the tooth crest side and the tooth root side during rotation transmission. Therefore, when the conventional resin spur gear 106 shown in FIG. 16 and FIG. 17 is used on the driving side, a sliding sound of the tooth 104 is loud when the meshing between the resin spur gear 106 and the tooth on the mating gear is released. Noise resulting from the sliding of the tooth 104 cannot be sufficiently reduced.

SUMMARY OF THE INVENTION

An object of the present invention is to provide a resin gear that can effectively reduce noise without compromising rotation transmission accuracy.

The invention according to claim 1 is related to a resin gear having a plurality of teeth having no torsion angle. In the resin gear of the invention, in a tooth, a tooth face that is a predetermined area from a tooth crest towards a tooth root side serves as a tooth profile modification area. A tooth surface excluding the tooth profile modification area serves as an involute profile area. The tooth profile modification area includes (1) a linear standard profile portion formed by an involute curved line from the tooth crest of the tooth towards the tooth root side and (2) a profile modification portion in which a tooth thickness gradually and smoothly decreases from the standard profile portion along a tooth width direction and the tooth thickness gradually and smoothly decreases from a tooth root end side towards the tooth crest. A contacting section becomes elastically deformed as a result of the resin gear coming into contact with a meshing mating gear, and (1) a tooth width direction length of the contact surface gradually increases from a minute, point-like width to a full tooth width from the tooth crest side towards the tooth root side, or (2) the tooth width direction length of the contact surface gradually decreases from the full tooth width to the minute, point-like width from the tooth root side towards the tooth crest side.

EFFECT OF THE INVENTION

In the invention, the contacting section between the resin gear and the mating gear on the tooth crest side of the tooth profile modification area is point-like and becomes elastically deformed. Therefore, impact occurring during meshing of the teeth is effectively absorbed. In the invention, the tooth width direction length of the contacting section between the tooth of the resin gear and the tooth of the mating gear becomes shorter as the sliding speed with the tooth surface of the meshing mating gear increases. Therefore, friction noise resulting from the sliding of the tooth surfaces can be reduced. As a result, in the invention, noise during rotative power transmission can be effectively reduced and the tooth of the resin gear can mesh with the tooth of the mating gear along the involute curved line from the tooth crest to the tooth root. Rotation transmission can be performed quietly and accurately.

BRIEF DESCRIPTION OF THE DRAWINGS

FIG. 3A is a perspective view of an outer appearance of the tooth 2; FIG. 3B is a front view of the tooth 2; FIG. 3C is a planar view of the tooth 2; FIG. 3D is a side view of the tooth 2 viewed from a direction perpendicular to a tooth width direction of the tooth 2 (tooth surface 3 side);

DETAILED DESCRIPTION OF THE PREFERRED EMBODIMENT

A resin gear according to embodiments of the present invention will be described in detail.

First Embodiment

Figure 1:
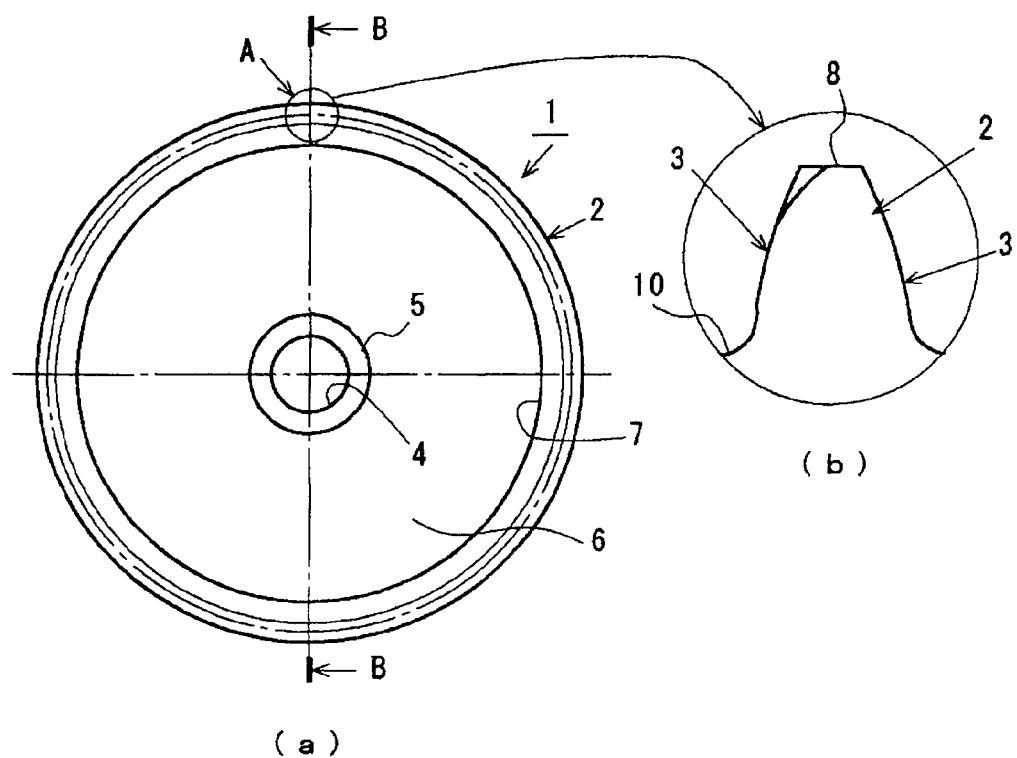
FIG. 1A is a front view of a resin spur gear 1 according to a first embodiment of the present invention.
FIG. 1B is an enlarged view of section A in FIG. 1A (enlarged view of a front surface side of a tooth 2)
Figure 2:
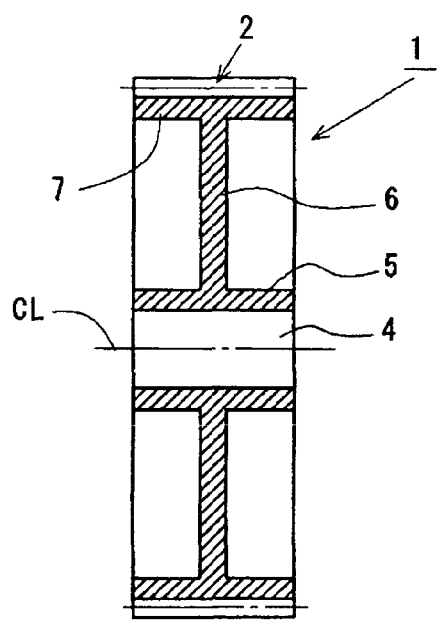
FIG. 2 is a cross-sectional view of FIG. 1 taken along line B-B.
Figure 3:
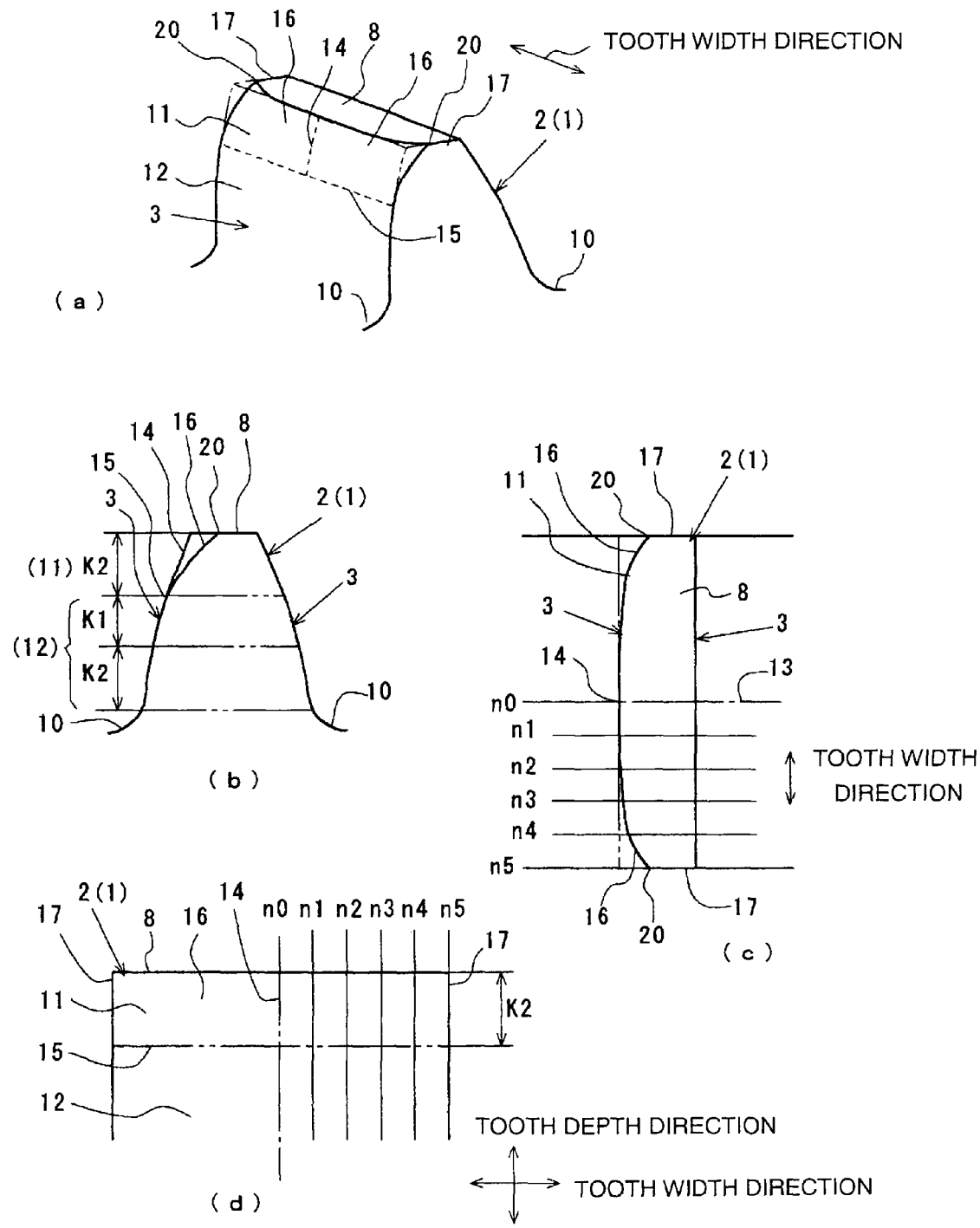
FIG. 3 is an enlarged view of the tooth 2.

FIG. 1A is a front view of a resin spur gear 1 according to a first embodiment of the present invention. FIG. 1B is an enlarged view of section A in FIG. 1A (enlarged view of a front surface side of a tooth 2). FIG. 2 is a cross-sectional view of FIG. 1 taken along line B-B. FIG. 3 is an enlarged view of the tooth 2. In FIG. 3, FIG. 3A is a perspective view of an outer appearance of the tooth 2. FIG. 3B is a front view of the tooth 2. FIG. 3C is a planar view of the tooth 2. FIG. 3D is a side view of the tooth 2 viewed from a direction perpendicular to a tooth width direction of the tooth 2 (tooth surface 3 side).

As shown in the diagrams, the resin spur gear 1 according to the embodiment is formed from a resin material, such as polyacetal, polyamide, polyphenylene sulfide, and polybutylene terephthalate. The resin spur gear 1 includes a cylindrical section 5, a disc-shaped web 6, and a cylindrical rim 7. The cylindrical section 5 has an axis hole 4 in the center. The web 6 extends in an outward radial direction from a central outer surface of the cylindrical section 5 that is in a direction along a center axis CL. The rim 7 is positioned on an outer circumferential edge of the web 6 and has a plurality of teeth 2 on its outer circumferential side.

A two-pair meshing area K2 of a tooth 2 on a tooth crest 8 side is a tooth profile modification area 11 in which a tooth profile is modified. The two-pair meshing area K2 is a tooth face and a predetermined area on a tooth surface 3 from the tooth crest 8 towards a tooth root 10 side. Areas of the tooth surface 3 excluding the tooth profile modification area 11 is an involute profile area 12 composed of an involute profile tooth surface.

The tooth profile modification area 11 of the tooth 2 includes a linear standard profile portion 14 and a profile modification portion 16. In the standard profile portion 14, a center 13 in the tooth width direction is formed by an involuted curved line from the tooth crest 8 to the involute profile area 12 side along the tooth depth direction. In the profile modification portion 16, a tooth thickness becomes thinner than a tooth thickness of the tooth surface of the involute tooth profile, gradually and smoothly decreasing from the standard profile portion 14 along the tooth width direction. In addition, the tooth thickness becomes thinner than the tooth thickness of the tooth surface of the involute tooth profile, gradually and smoothly decreasing from a tooth root side end (border with the involute profile area 12) 15 towards the tooth crest 8.

Figure 4:
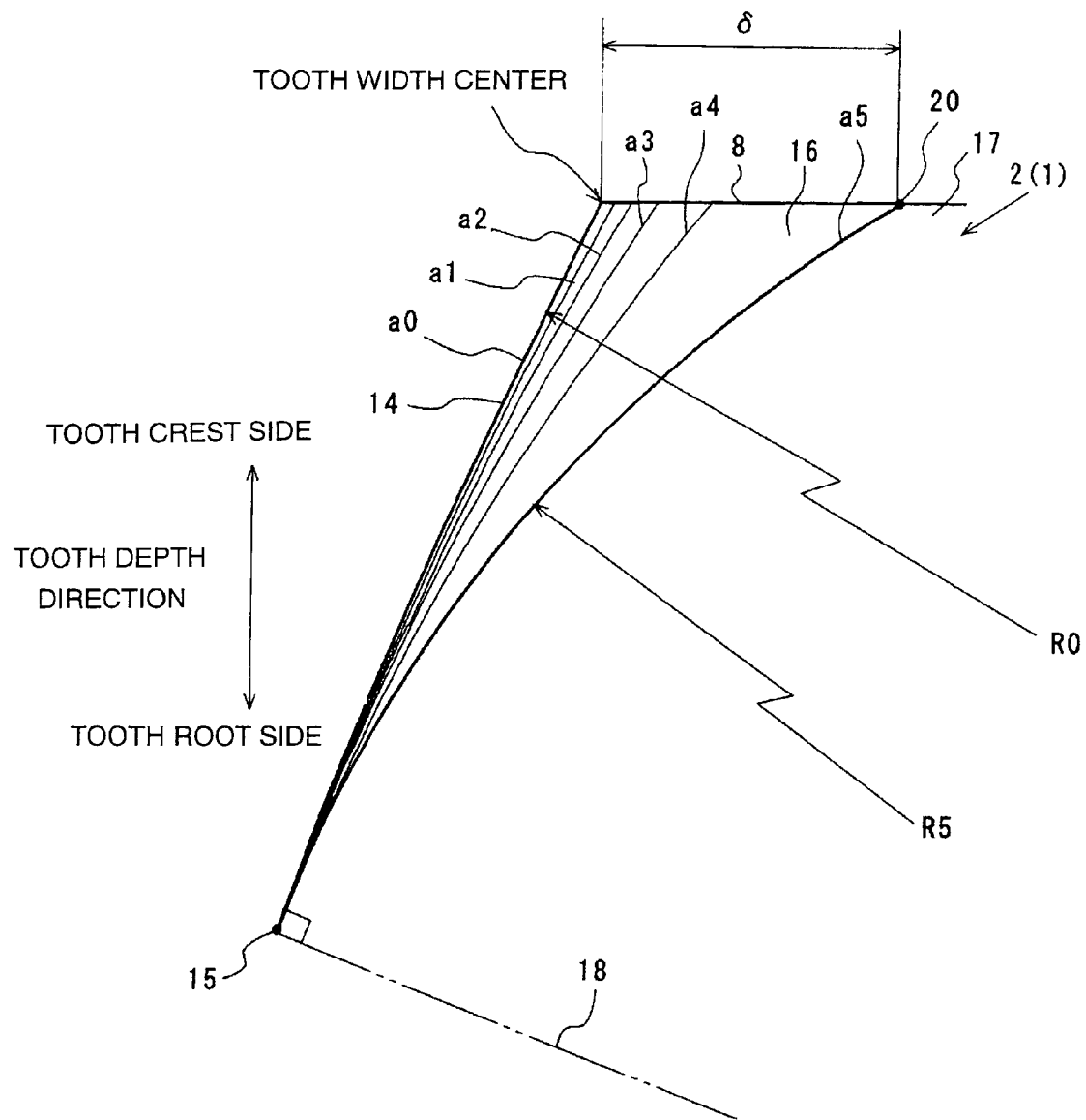
FIG. 4 is a diagram of a shape of a tooth profile in a tooth profile modification area shown divided in the tooth width direction.

FIG. 4 is a diagram of curved lines a0 to a5 corresponding with tooth surface shapes of tooth profile cross-sections at each division position (n0 to n5), when the tooth profile modification area 11 of the tooth 2 is divided into five equal portions along the tooth width direction, from the center 13 of the tooth 2 in the tooth width direction to a tooth width direction end 17. The curved line a0 indicates the standard profile portion 14 in the center 13 of the tooth 2 in the tooth width direction. The curved line a5 indicates a curved line corresponding with the tooth surface shape of the tooth width direction end 17 of the tooth 2.

Here, a curvature radius of each curved line, from curved line a1 to a4, is determined as follows. First, an arc of a curvature radius R0 similar to an involuted curved line is determined as the curved line a0 of the standard profile portion 14. In FIG. 4, a center point of the arc of the curvature radius R0 is positioned in a normal direction of the arc of the curvature radius R0 from a tooth crest modification starting point (a location that is the tooth root side end 15 of the tooth profile modification area 11 and corresponds to a border between the tooth profile modification area 11 and the involute profile area 12) and is on a virtual plane 18 that is perpendicular to a paper surface.

Next, a tooth width direction end point 20 corresponding with a desired tooth crest modification amount d in the tooth width direction end 17 of the tooth crest 8 is decided. An arc that passes through the tooth width direction end point 20 and the tooth crest modification starting point (tooth root side end 15) and is of an arbitrary curvature radius R5 (where R0>R5), of which the center point is positioned on the virtual plane 18, is decided.

Next, the curvature radii R1 to R4 of the arc at each division position n1 to n4 is decided as indicated in Equations 1 to 4, below, based on the above-mentioned R0 and R5.

$$R1 = R0 - 1 \cdot \frac{(R0 - R5)}{5} \qquad \text{Equation 1}$$

$$R2 = R0 - 2 \cdot \frac{(R0 - R5)}{5} \qquad \text{Equation 2}$$

$$R3 = R0 - 3 \cdot \frac{(R0 - R5)}{5} \qquad \text{Equation 3}$$

$$R4 = R0 - 4 \cdot \frac{(R0 - R5)}{5} \qquad \text{Equation 4}$$

To facilitate understanding, an example is given in the description according to the embodiment described above in which an area from the center 13 of the tooth 2 in the tooth width direction to the tooth width direction end 17 is divided into five equal portions along the tooth width direction. However, the invention is not limited thereto. Depending on a module and tooth width measurement, the area from the center 13 of the tooth 2 in the tooth width direction to the tooth width direction end 17 can be divided into a suitable number of portions along the tooth width direction. The curvature radii of the arcs corresponding to the division positions can be determined.

The tooth surface in the tooth profile modification area 11 is formed by each cross-sectional shape of the tooth 2, determined as described above, being smoothly connected in the tooth width direction. The tooth surface in the tooth profile modification area 11 is a convex curved surface. As described above, in the profile modification portion 16 excluding the standard profile portion 14 in the center 13 of the tooth 2 in the tooth width direction, the tooth thickness becomes thinner than the tooth thickness of the tooth surface of the involute tooth profile, gradually and smoothly decreasing from the standard profile portion 14 along the tooth width direction. In addition, the tooth thickness becomes thinner than the tooth thickness of the tooth surface of the involute tooth profile, gradually and smoothly decreasing from a tooth root side end (border with the involute profile area 12) 15 towards the tooth crest 8.

Figure 5:
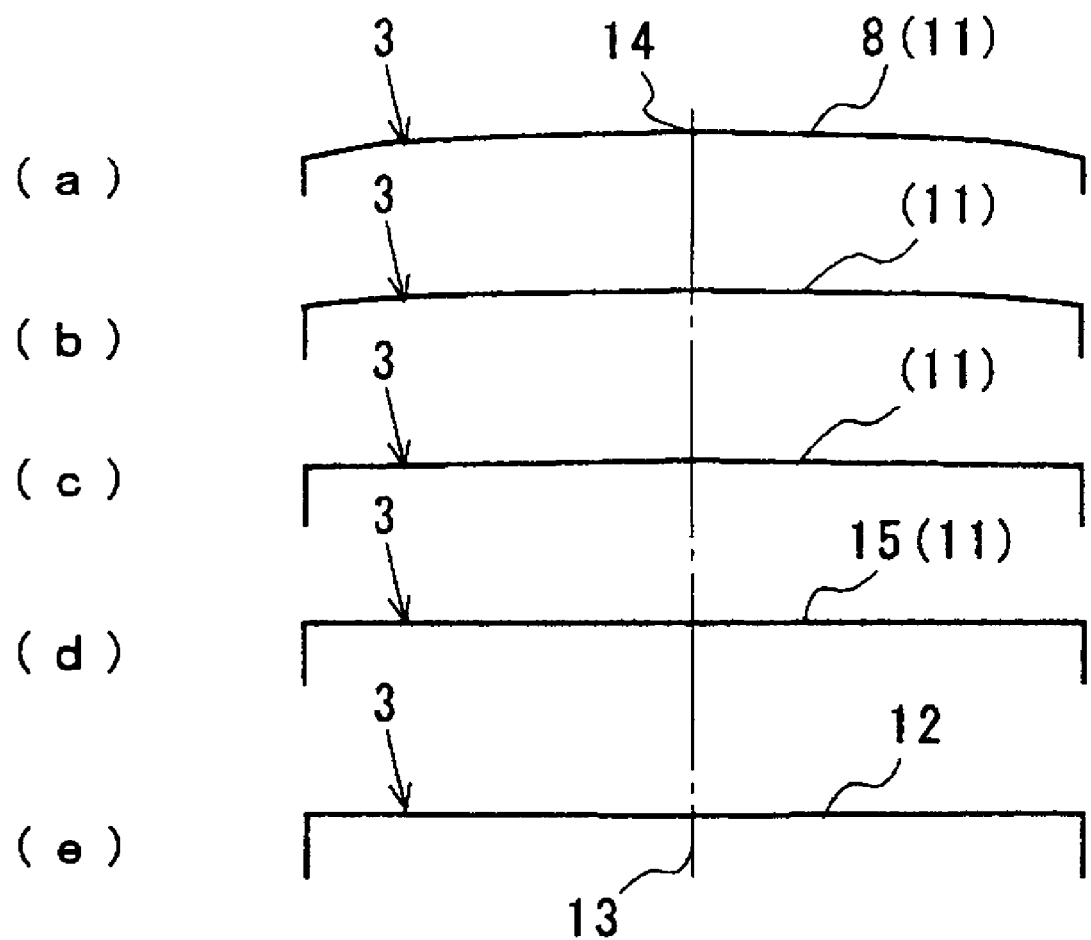
FIG. 5 is a diagram of a tooth surface divided into a plurality of portions parallel to a tooth trace, along a direction of a tooth depth.

FIG. 5 is a diagram of the tooth surface in the tooth profile modification area 11 that is divided into a plurality of portions from the tooth crest 8 to the tooth root side end 15, in parallel with a tooth trace. In FIG. 5, the shapes of the tooth surface from the tooth crest 8 to the tooth root side end 15 is shown in sequence in FIG. 5A to FIG. 5D. FIG. 5E is a diagram of a tooth surface shape along the tooth trace in the involute profile area 12.

As shown in FIG. 5D and FIG. 5E, the tooth surface shape in the tooth root side end 15 of the tooth profile modification area 11 and the tooth surface shape in the involute profile area 12 are the same and are indicated by a straight line running along the tooth width direction. A percentage of change in a curved line that is convex on top in FIG. 5 increases (refer to FIG. 5C to FIG. 5A) from the tooth root side end 15 of the tooth profile modification area 11 towards the tooth crest 8 (from FIG. 5D towards FIG. 5A). In the tooth profile modification area 11, the tooth surface shapes shown in FIG. 5C to FIG. 5A are smooth, exponential curved lines. The tooth surface shape curves widely from the standard profile portion 14 in the center 13 in the tooth width direction towards the tooth width direction. As shown in FIG. 5, the tooth surface shape is formed such that one tooth width direction end side of the center 13 and another tooth width direction end side are symmetrical (left-right symmetry).

Figure 6:
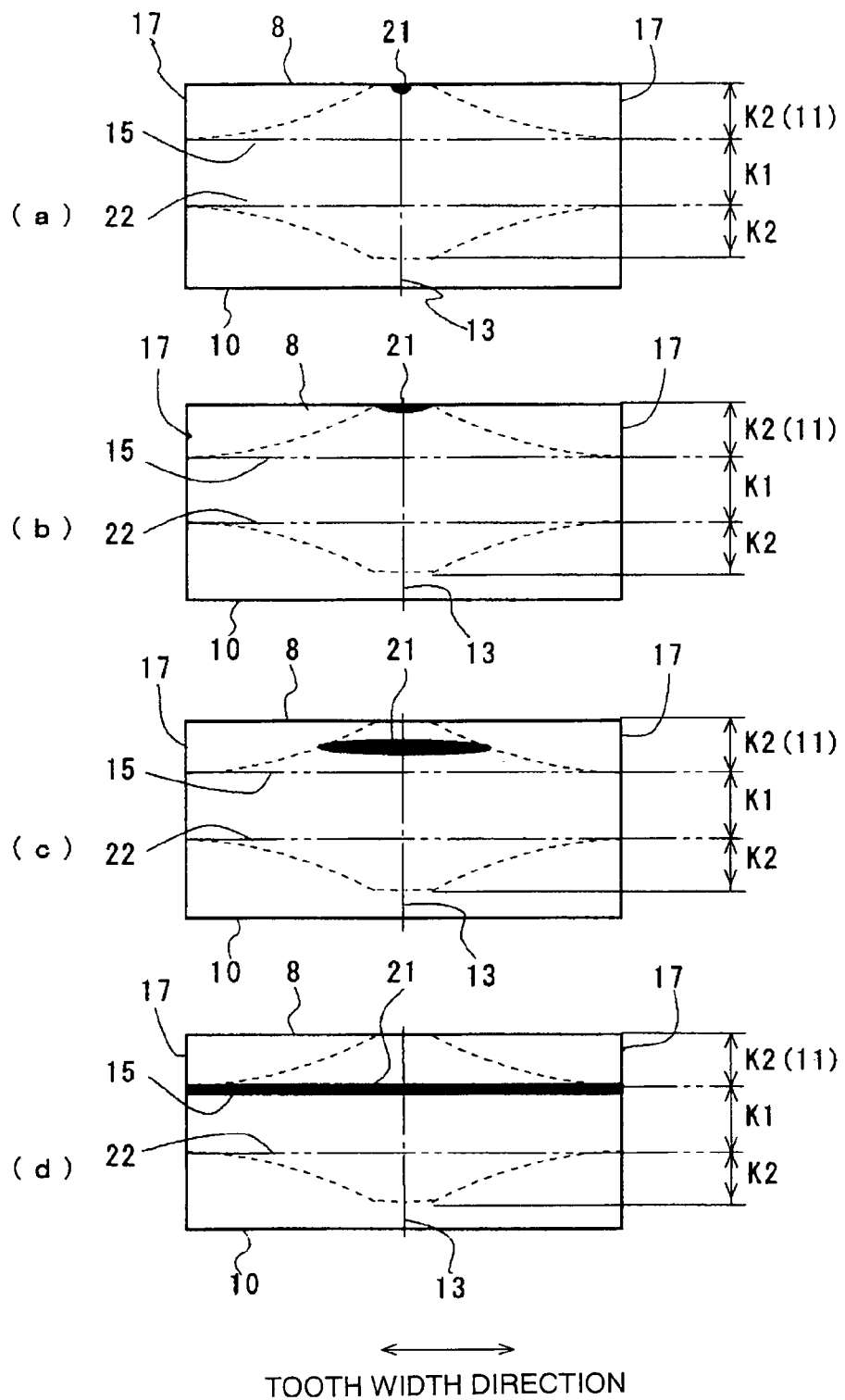
FIG. 6 is a diagram of change states in a contacting section with a tooth of a mating gear in the tooth profile modification area.

When the resin spur gear 1 according to the embodiment, formed as described above, is disposed on a driven side and transmits rotative power, a contact position between the resin spur gear 1 and a mating gear (driver side spur gear) moves from the tooth crest 8 side of the tooth surface towards the tooth root 10 side. At this time, as shown in FIG. 6A, a length in the tooth width direction of a contacting section 21 of the resin spur gear 1 according to the embodiment at a contact starting position (meshing starting position) between the resin spur gear 1 and the mating gear has a minute, point-like width. However, the tooth surface elastically deforms as a result of external force (power transmission load). Therefore, the tooth width direction length of the contacting section 21 between the resin spur gear 1 and the mating gear changes to a linear shape immediately after the resin spur gear 1 meshes with the mating gear (see FIG. 6B). Then, as the meshing position between the resin spur gear 1 and the mating gear in the tooth profile modification area 11 becomes closer to the tooth root side end 15, the tooth width direction length of the contacting section 21 between the resin spur gear 1 and the mating gear in the resin spur gear 1 according to the invention gradually increases (see FIG. 6B to FIG. 6C). As shown in FIG. 6D, when the meshing position between the resin spur gear 1 and the mating gear reaches the tooth root side end 15 in the tooth profile modification area 11, the tooth width direction length of the contacting section 21 between the resin spur gear 1 and the mating gear in the resin spur gear 1 according to the invention becomes a full tooth width. A meshing state such as that described above of the tooth 2 of the resin spur gear 1 according to the embodiment occurs as a result of the shape of the tooth surface 3 in the tooth profile modification area 11 of the tooth 2 and elastic deformation of the tooth surface 3 (compressive deformation of the tooth surface due to power transmission load).

When the resin spur gear 1 according to the embodiment is disposed on the driving side and transmits rotative power, the contact position between the resin spur gear 1 and the mating gear (driven side spur gear) moves from the tooth root 10 side towards the tooth crest 8 side. At this time, the tooth width direction length of the contacting section 21 between the resin spur gear 1 and the mating gear in the tooth profile modification area 11 of the tooth 2 gradually decreases from the tooth root end 15 towards the tooth crest 8 in the sequence shown in FIG. 6D to FIG. 6B. When the crest 8 is disengaged (upon release of meshing), the contacting section 21 of the resin spur gear 1 according to the embodiment becomes point-like, as shown in FIG. 6A.

Here, when the entire tooth surface of the tooth on the mating gear meshing with the resin spur gear 1 according to the embodiment is an involute profile tooth surface, the contacting section 21 between the resin spur gear 1 and the mating gear at the involute profile area (the one-pair meshing area K1 and the two-pair meshing area K2 on the tooth root 10 side) 12 becomes the full tooth width.

Figure 7:
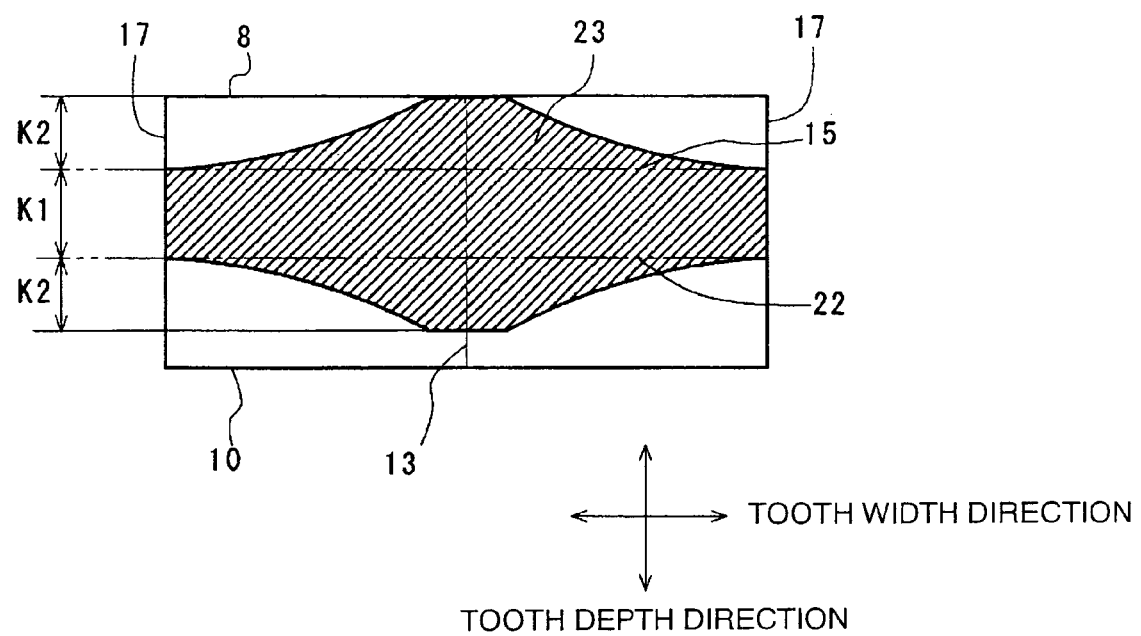
FIG. 7 is a diagram of an area of the contacting section of the tooth integrated in a tooth depth direction when the tooth profile modification area is also formed in a two-pair meshing area on a tooth crest side of a meshing partner gear.

However, when the two-pair meshing area on the tooth crest side of the tooth on the mating gear meshing with the resin spur gear 1 according to the embodiment is formed in the same manner as the tooth profile modification area 11 of the tooth 2 of the resin spur gear 1 according to the embodiment, the tooth width direction length in the contacting section between the two-pair meshing area K2 on the tooth root 10 side of the tooth 2 of the resin spur gear 1 according to the embodiment and the two-pair meshing area on the tooth crest side of the tooth on the mating gear gradually decreases from a tooth crest end (border with the one-pair meshing area K1) 22 in the two-pair meshing area K2 on the tooth root 10 side of the tooth 2 of the resin spur gear 1 according to the embodiment towards the tooth root 10 side, such as to change in the sequence shown in FIG. 6D to FIG. 6A. FIG. 7 is a diagram of the tooth width direction length of the contacting section between the tooth of the resin spur gear 1 according to the embodiment and the tooth of the mating gear, such as that described above, integrated in a tooth depth direction. In FIG. 7, a shaded area 23 indicates a shape obtained by the contacting section 21 being integrated in the tooth depth direction. The shaded area 23 is shaped into an octagon that is compressed in the tooth depth direction. As is clear from FIG. 7, regarding the tooth width direction length of the contacting section 21 between the tooth 2 of the resin spur gear 1 according to the embodiment and the tooth of the mating gear, the two-pair meshing area K2 on the tooth crest 8 side and the two-pair meshing area K2 on the tooth root 10 side are formed to be symmetrical on the top and bottom in FIG. 7, with the one-pair meshing area K1 as the border.

In the resin spur gear 1 according to the embodiment, such as that described above, the contacting section 21 on the tooth crest 8 side of the tooth profile modification area 11 at the start of meshing between the tooth 2 of the resin spur gear 1 and the tooth of the mating gear is point-like and becomes elastically deformed. Therefore, impact occurring at the start of meshing of the teeth can be effectively absorbed.

In the resin spur gear 1 according to the embodiment, the tooth width direction length of the contacting section 21 between the tooth 2 of the resin spur gear 1 and the tooth of the mating gear in the tooth profile modification area 11 decreases as the sliding speed with the tooth surface of the mating gear with which the resin spur gear 1 meshes increases. Therefore, friction noise resulting from the sliding of tooth surfaces can be reduced.

As a result, in the resin spur gear 1 according to the embodiment, noise during rotative power transmission can be effectively suppressed. The resin spur gear 1 can mesh with the tooth of the mating gear along the involuted curved line from the tooth crest 8 side to the tooth root 10 side. The rotation transmission can be performed quietly and accurately.

In the resin spur gear 1 according to the embodiment, when the tooth surface of the tooth on the mating gear with which the resin spur gear 1 meshes is formed in the same manner as the tooth surface of the tooth 2 on the resin spur gear 1 according to the embodiment, noise during rotative power transmission can be more effectively reduced.

Second Embodiment

Figure 8:
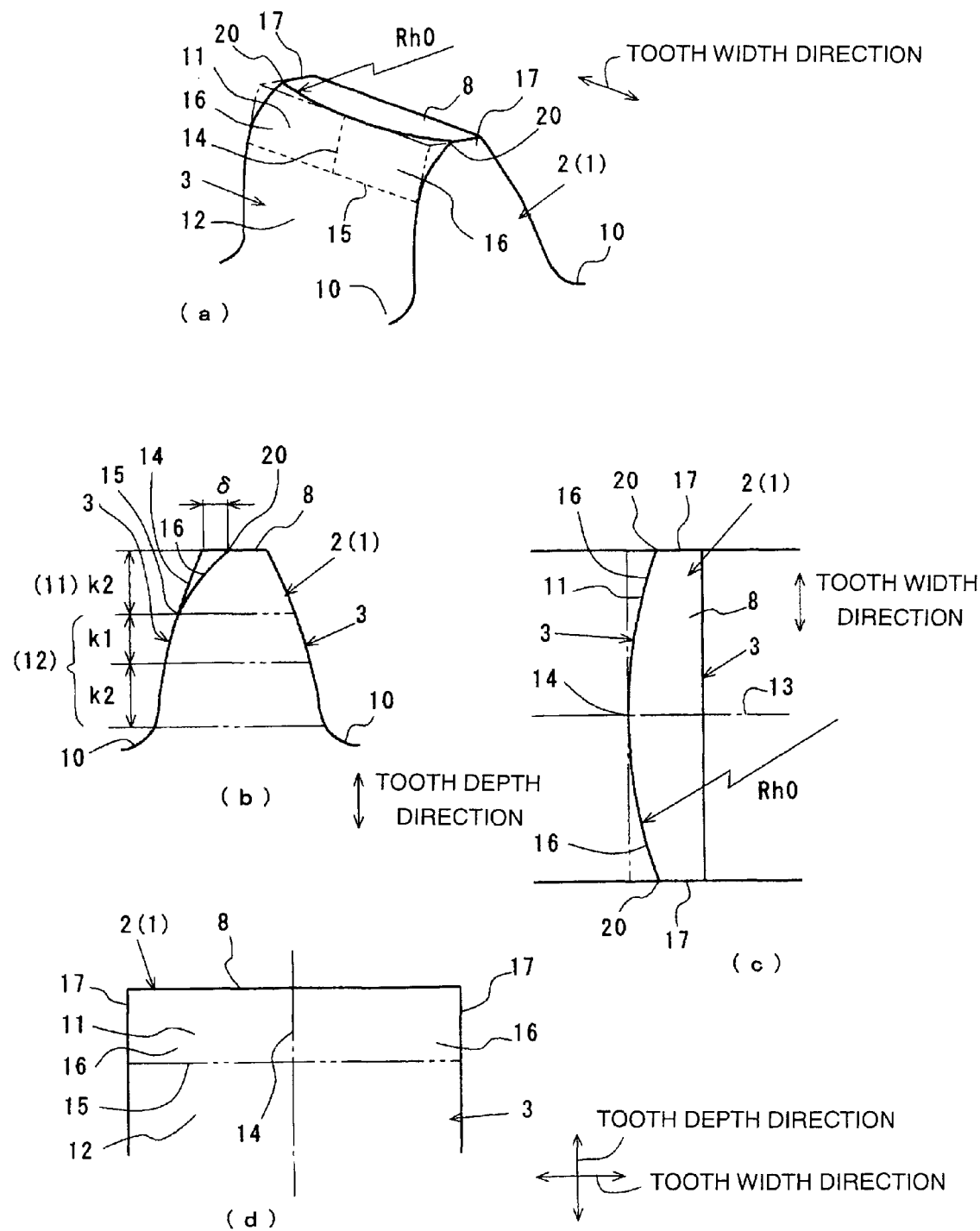
FIG. 8 is a diagram of a tooth of a resin spur gear according to a second embodiment of the invention, corresponding to FIG. 3.
Figure 9:
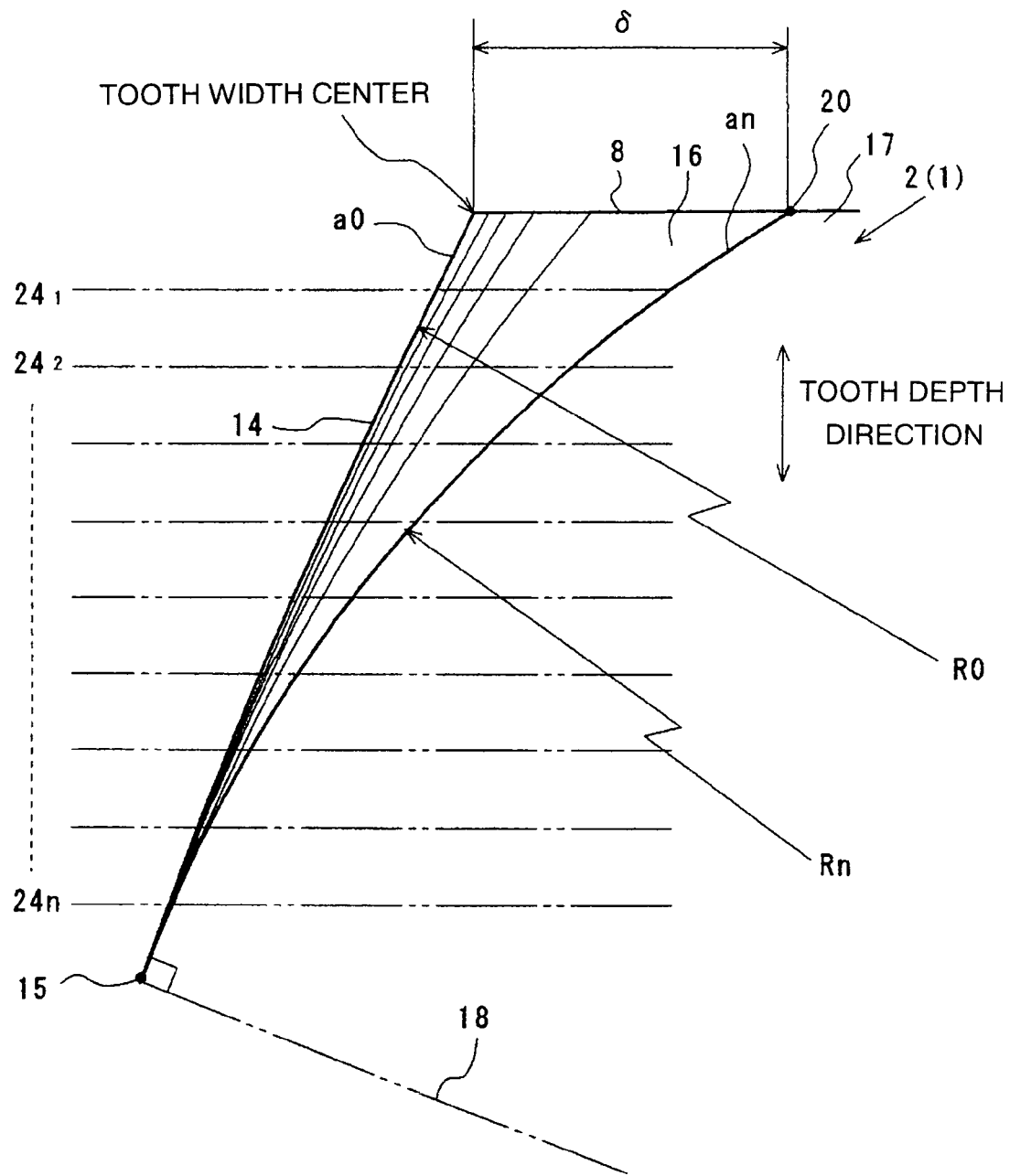
FIG. 9 is a diagram of a tooth profile shape in a tooth profile modification area shown divided in the tooth width direction of the tooth of the resin spur gear according to the second embodiment of the invention, corresponding to FIG. 4.

A resin spur gear 1 according to a second embodiment will be described with reference to FIG. 8 to FIG. 9. FIG. 8 corresponds to FIG. 3 according to the first embodiment. FIG. 9 corresponds to FIG. 4 according to the first embodiment. Constituent elements in the resin spur gear 1 according to the embodiment that are the same as those in the resin spur gear 1 according to the first embodiment are given the same reference numbers. Explanations that are the same as those according to the first embodiment are omitted.

The tooth profile modification area 11 of the tooth 2 on the resin spur gear 1 in FIG. 8 includes the linear standard profile portion 14 and the profile modification portion 16, as does the resin spur gear 1 according to the first embodiment. In the standard profile portion 14, the center 13 in the tooth width direction is formed by an involuted curved line from the tooth crest 8 to the involute profile area 12 side along the tooth depth direction. In the profile modification portion 16, the tooth thickness becomes thinner than the tooth thickness of the tooth surface of the involute tooth profile, gradually and smoothly decreasing from the standard profile portion 14 along the tooth width direction. In addition, the tooth thickness becomes thinner than the tooth thickness of the tooth surface of the involute tooth profile, gradually and smoothly decreasing from a tooth root side end (border with the involute profile area 12) 15 towards the tooth crest 8.

Next, a method for deciding the tooth surface shape in the tooth profile modification area 11 of the tooth 2 will be described.

First, the arc of the curvature radius R0 similar to the involuted curved line is determined as the curved line a0 of the standard profile portion 14. In FIG. 9, the center point of the arc of the curvature radius R0 is positioned in a normal direction of the arc of the curvature radius R0 from the tooth root side end 15 of the tooth profile modification area 11 and is on the virtual plane 18 that is perpendicular to the paper surface.

Next, the tooth width direction end point 20 corresponding with the desired tooth crest modification amount d on the tooth width direction end 17 of the tooth crest 8 is decided. The arc that passes through the tooth width direction end point 20 and the tooth root side end 15 and is an arc of an arbitrary curvature radius Rn (where R0>Rn), of which the center point is positioned on the virtual plane 18, is decided.

Next, an arc of a curvature radius R0 of the tooth crest 8 that passes through three points is determined (see FIG. 8C). The three points are the standard profile portion 14 (the center 13 in the tooth width direction and an intersection between the involute curved line and the tooth crest 8) and tooth width direction end points 20 and 20 on both tooth width direction ends 17 and 17.

Next, as shown in the diagram, the tooth profile modification area 11 of the tooth 2 is divided by virtual planes $24_1$ to $24_n$ that are perpendicular to the tooth depth direction and run along the tooth trace direction. An arc of a curvature radius that passes through three points is decided. The three points are intersections between the curved line an of the curvature radius Rn and both tooth width direction ends 17 and 17 along the tooth trace on each division surface, and the standard profile portion 14. The convex curved surface forming the tooth surface 3 is formed by each arc of the curvature radii running along the tooth traces being smoothly connected along the tooth depth direction.

In the tooth profile modification area 11 of the tooth 2 on the resin spur gear 1 according to the embodiment, formed as described above, the shape of the tooth surface divided along the tooth width direction is similar to that of the resin spur gear 1 according to the first embodiment shown in FIG. 4.

Therefore, the resin spur gear 1 according to the embodiment can achieve the same advantageous effects as the resin spur gear 1 according to the first embodiment.

Third Embodiment

Figure 10:
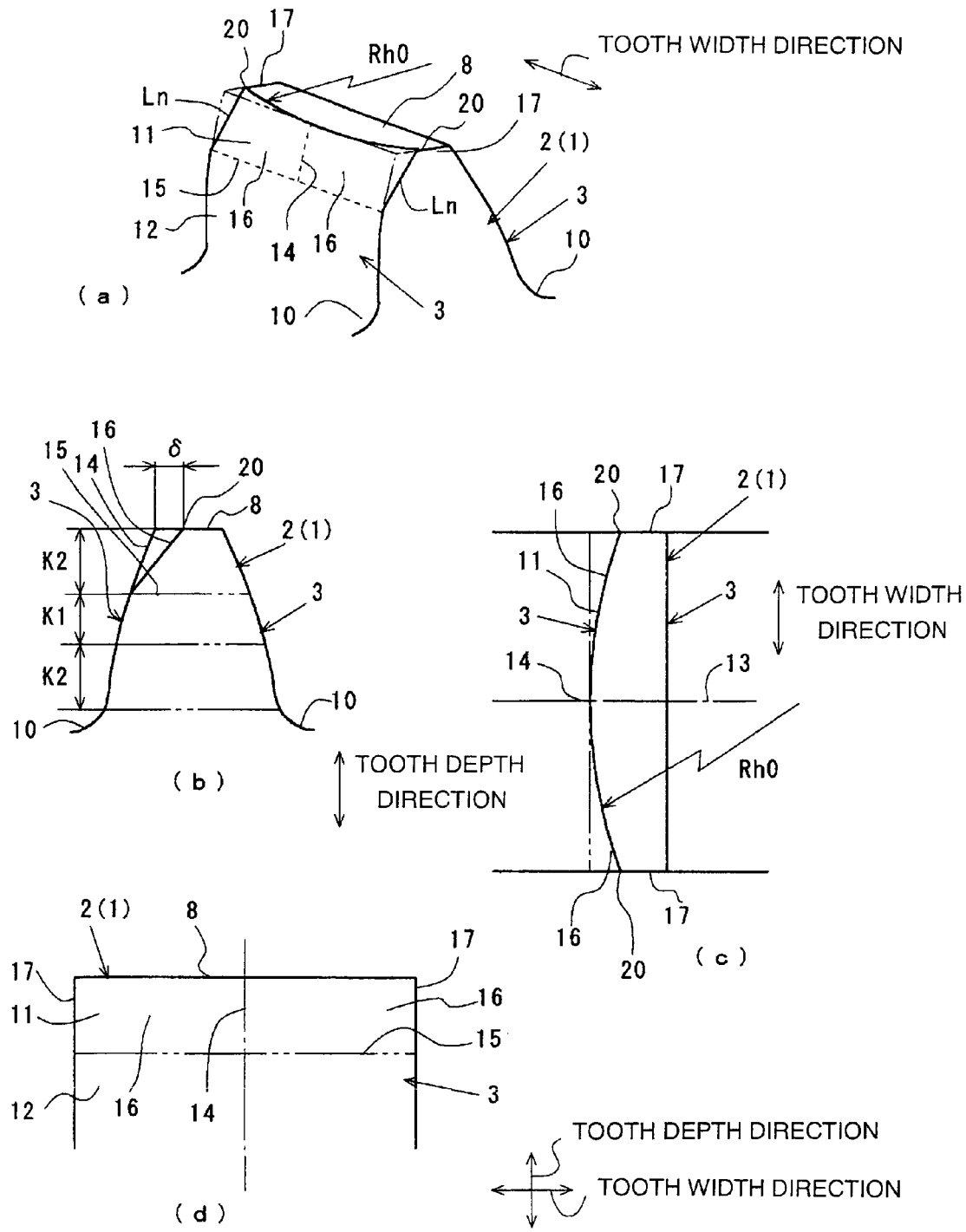
FIG. 10 is a diagram of a tooth of a resin spur gear according to a third embodiment of the invention, corresponding to FIG. 3.
Figure 11:
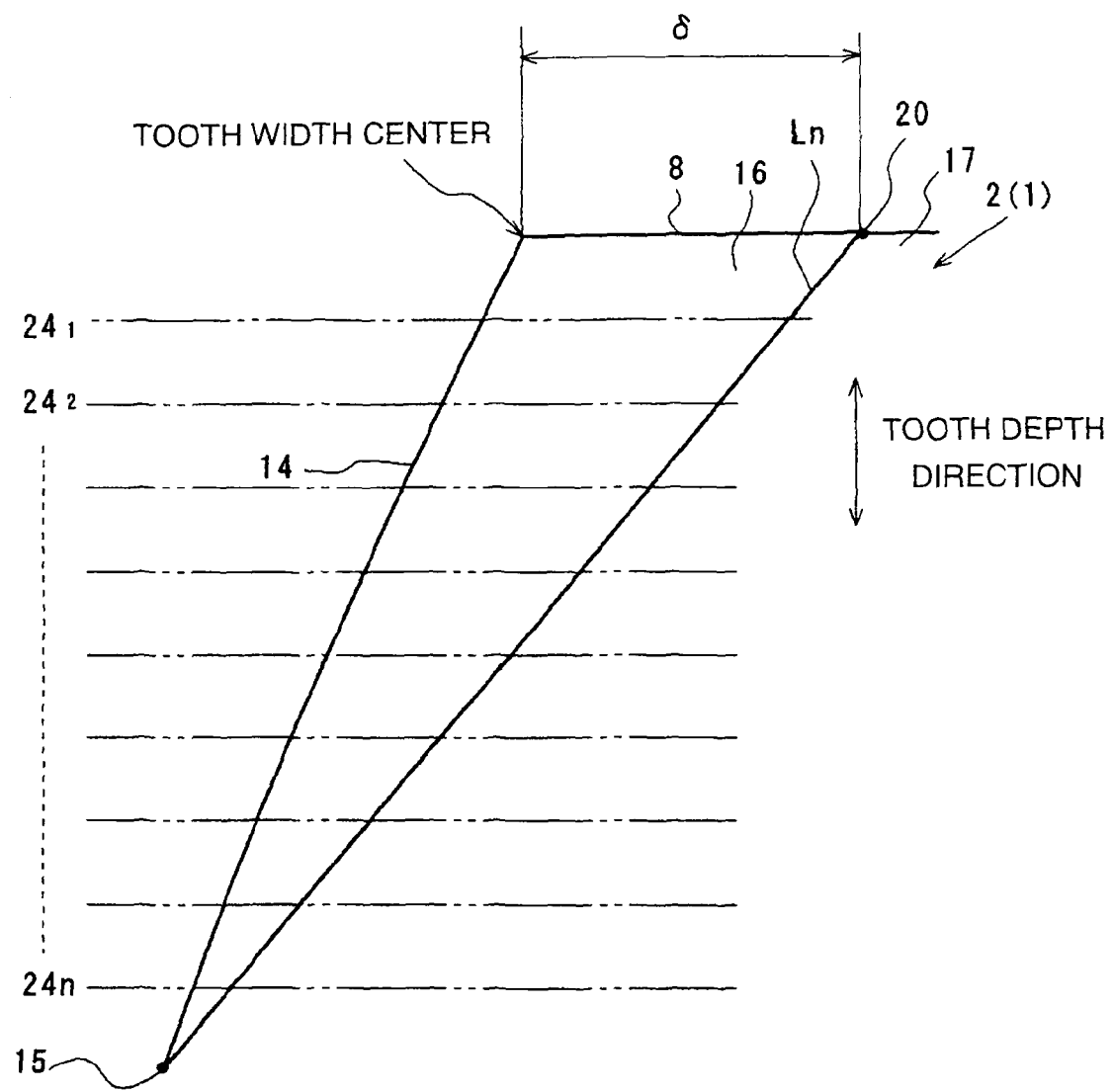
FIG. 11 is a diagram of a tooth profile shape in a tooth profile modification area shown divided in the tooth width direction of the tooth of the resin spur gear according to the third embodiment of the invention, corresponding to FIG. 4.

A resin spur gear 1 according to a third embodiment of the invention will be described with reference to FIG. 10 and FIG. 11. FIG. 10 is a diagram corresponding with FIG. 3 according to the first embodiment. FIG. 11 is a diagram corresponding with FIG. 4 according to the first embodiment. Constituent elements in the resin spur gear 1 according to the embodiment that are the same as those in the resin spur gear 1 according to the first embodiment are given the same reference numbers. Explanations that are the same as those according to the first embodiment are omitted.

The tooth profile modification area 11 of the tooth 2 on the resin spur gear 1 in the diagrams includes the linear standard profile portion 14 and the profile modification portion 16, as does the resin spur gear 1 according to the first embodiment. In the standard profile portion 14, the center 13 in the tooth width direction is formed by an involuted curved line from the tooth crest 8 to the involute profile area 12 side along the tooth depth direction. In the profile modification portion 16, the tooth thickness becomes thinner than the tooth thickness of the tooth surface of the involute tooth profile, gradually and smoothly decreasing from the standard profile portion 14 along the tooth width direction. In addition, the tooth thickness becomes thinner than the tooth thickness of the tooth surface of the involute tooth profile, gradually and smoothly decreasing from a tooth root side end (border with the involute profile area 12) 15 towards the tooth crest 8.

Next, a method for deciding the tooth surface shape in the tooth profile modification area 11 of the tooth 2 will be described.

First, the tooth width direction end points 20 and 20 corresponding with the desired tooth crest modification amount d on the tooth width direction ends 17 and 17 of the tooth crest 8 is decided. A straight line Ln connecting the tooth width direction end points 20 and 20 and the tooth root side end 15 is decided.

Next, the arc of the curvature radius R0 of the tooth crest 8 that passes through three points is determined. The three points are the standard profile portion 14 (the center 13 in the tooth width direction and an intersection between the involute curved line and the tooth crest 8), and tooth width direction end points 20 and 20 on both tooth width direction ends 17 and 17.

Next, as shown in FIG. 11, the tooth profile modification area 11 of the tooth 2 is divided by the virtual planes $24_1$ to $24_n$ that are perpendicular in the tooth depth direction and run along the tooth trace. An arc of a curvature radius that passes through three points is decided. The three points are intersections between the straight line Ln and both tooth width direction ends 17 between along the tooth trace on each division surface, and the standard profile portion 14. The convex curved surface forming the tooth surface 3 is formed by each arc of the curvature radii running along the tooth traces being smoothly connected along the tooth depth direction.

In the tooth profile modification area 11 of the tooth 2 on the resin spur gear 1 according to the embodiment, formed as described above, the shape of the cross-section of the tooth surface divided along the tooth width direction, perpendicular to the tooth width direction, is such that the curvature radius gradually increases from the center 13 in the tooth width direction towards the tooth width direction ends 17 and 17, similar to the straight line Ln of the tooth width direction ends 17 and 17.

The resin spur gear 1 according to the embodiment having the tooth profile modification area 11 such as that described above can reduce noise during rotative power transmission, as can the resin spur gear 1 according to the first embodiment. The rotation transmission can be accurately performed.

Fourth Embodiment

Figure 12:
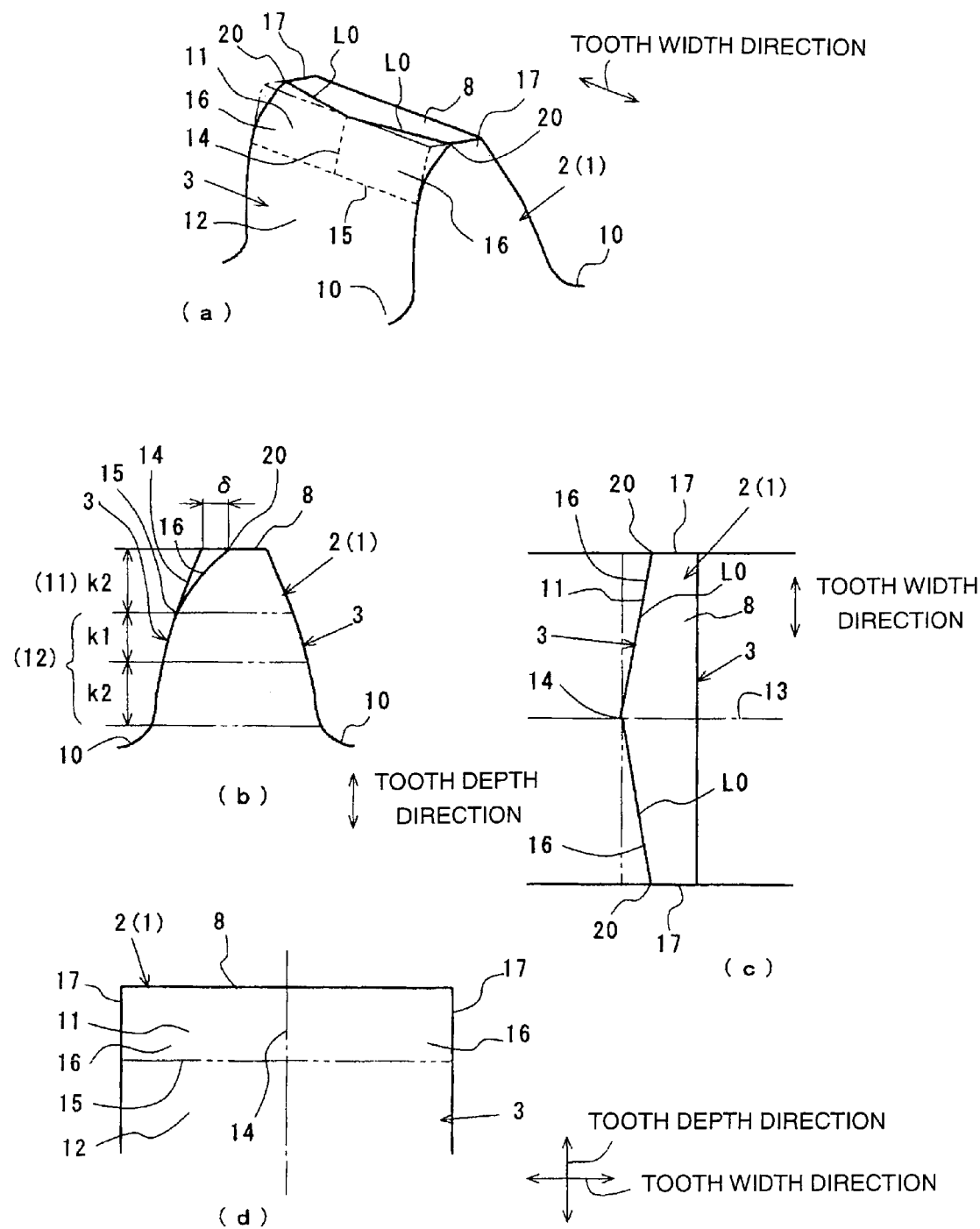
FIG. 12 is a diagram of a tooth of a resin spur gear according to a fourth embodiment of the invention, corresponding to FIG. 3.
Figure 13:
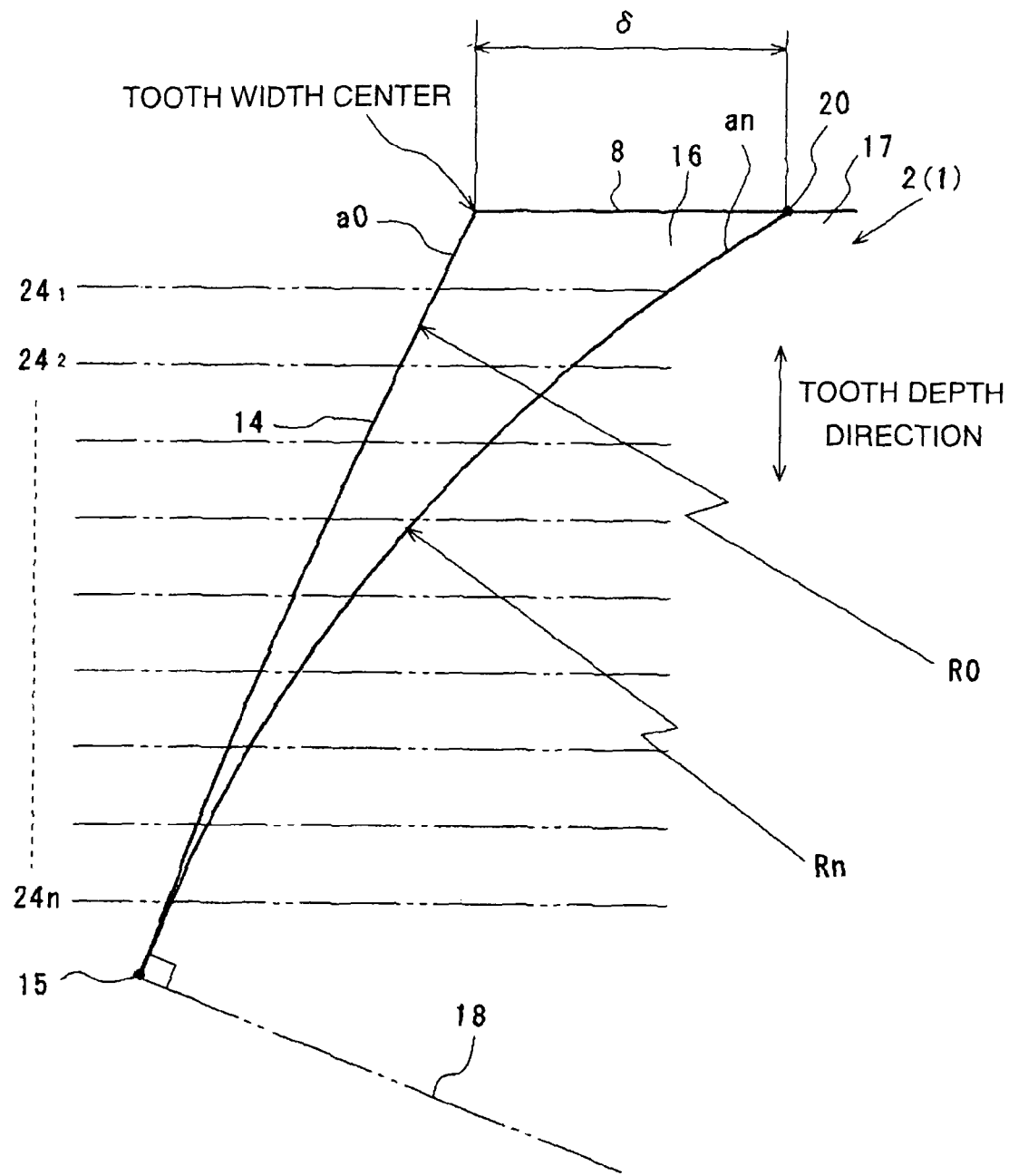
FIG. 13 is a diagram of a tooth profile shape in a tooth profile modification area shown divided in the tooth width direction of the tooth of the resin spur gear according to the fourth embodiment of the invention, corresponding to FIG. 4.

A resin spur gear 1 according to a fourth embodiment of the invention will be described with reference to FIG. 12 and FIG. 13. FIG. 12 is a diagram corresponding with FIG. 3 according to the first embodiment. FIG. 13 is a diagram corresponding with FIG. 4 according to the first embodiment. Constituent elements in the resin spur gear 1 according to the embodiment that are the same as those in the resin spur gear 1 according to the first embodiment are given the same reference numbers. Explanations that are the same as those according to the first embodiment are omitted.

The tooth profile modification area 11 of the tooth 2 on the resin spur gear 1 in the diagrams includes the linear standard profile portion 14 and the profile modification portion 16, as does the resin spur gear 1 according to the first embodiment. In the standard profile portion 14, the center 13 in the tooth width direction is formed by an involuted curved line from the tooth crest 8 to the involute profile area 12 side along the tooth depth direction. In the profile modification portion 16, the tooth thickness becomes thinner than the tooth thickness of the tooth surface of the involute tooth profile, gradually and smoothly decreasing from the standard profile portion 14 along the tooth width direction. In addition, the tooth thickness becomes thinner than the tooth thickness of the tooth surface of the involute tooth profile, gradually and smoothly decreasing from a tooth root side end (border with the involute profile area 12) 15 towards the tooth crest 8.

Next, a method for deciding the tooth surface shape in the tooth profile modification area 11 of the tooth 2 will be described.

First, the arc of the curvature radius R0 that is similar to the involuted curved line is determined as the curved line a0 of the standard profile portion 14. In FIG. 13, the center point of the arc of the curvature radius R0 is positioned in a normal direction of the arc of the curvature radius R0 from the tooth root side end 15 of the tooth profile modification area 11 and is on the virtual plane 18 that is perpendicular to the paper surface.

Next, the tooth width direction end point 20 corresponding with the desired tooth crest modification amount d on the tooth width direction end 17 of the tooth crest 8 is decided. A curved line an that is an arc passing through the tooth width direction end point 20 and the tooth root side end 15 and has an arbitrary curvature radius Rn (where R0>Rn), of which the center point is positioned on the virtual plane 18, is decided.

Next, in the tooth crest 8, a straight line L0 connecting (the center 13 in the tooth width direction and an intersection between the involute curved line and the tooth crest 8), and tooth width direction end points 20 and 20 on both tooth width direction ends 17 and 17 is determined.

Next, as shown in FIG. 13, the tooth profile modification area 11 of the tooth 2 is divided by the virtual planes $24_1$ to $24_n$ that are perpendicular to the tooth depth direction and run along the tooth trace. A straight line connecting the intersections between the curved line an of the curvature radius Rn and both tooth width direction ends 17 and 17 along the tooth trace on each division surface, and the standard profile portion 14 is determined. The convex curved surface forming the tooth surface 3 is formed by each straight line running along the tooth traces being smoothly connected along the tooth depth direction.

In the tooth profile modification area 11 of the tooth 2 on the resin spur gear 1 according to the embodiment, formed as described above, the shape of the cross-section of the tooth surface divided along the tooth width direction is similar to that of the resin spur gear 1 according to the first embodiment shown in FIG. 4.

Therefore, the resin spur gear 1 according to the embodiment can reduce noise during rotative power transmission, as can the resin spur gear 1 according to the first embodiment. The rotation transmission can be accurately performed.

Fifth Embodiment

Figure 14:
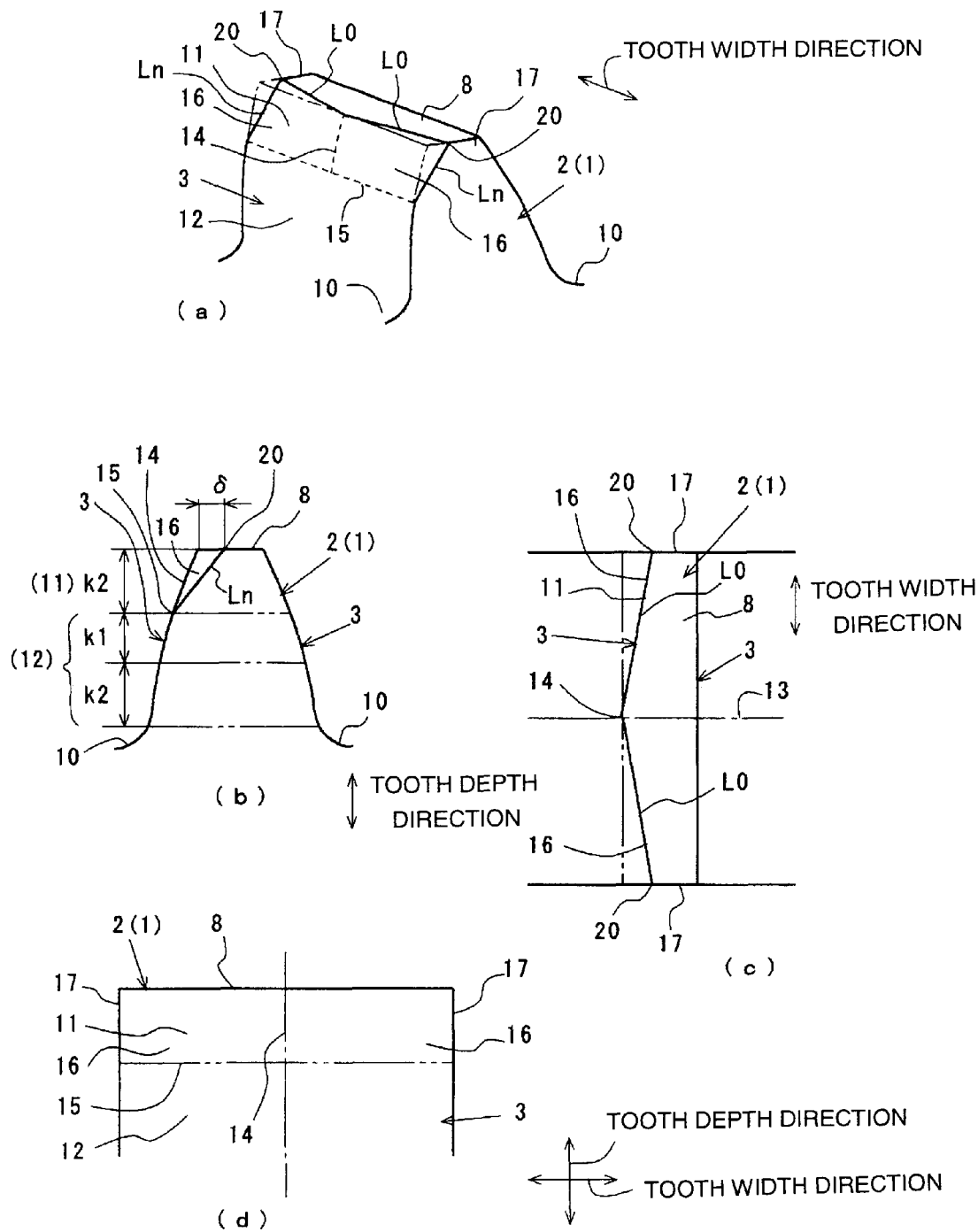
FIG. 14 is a diagram of a tooth of a resin spur gear according to a fifth embodiment of the invention, corresponding to FIG. 3.
Figure 15:
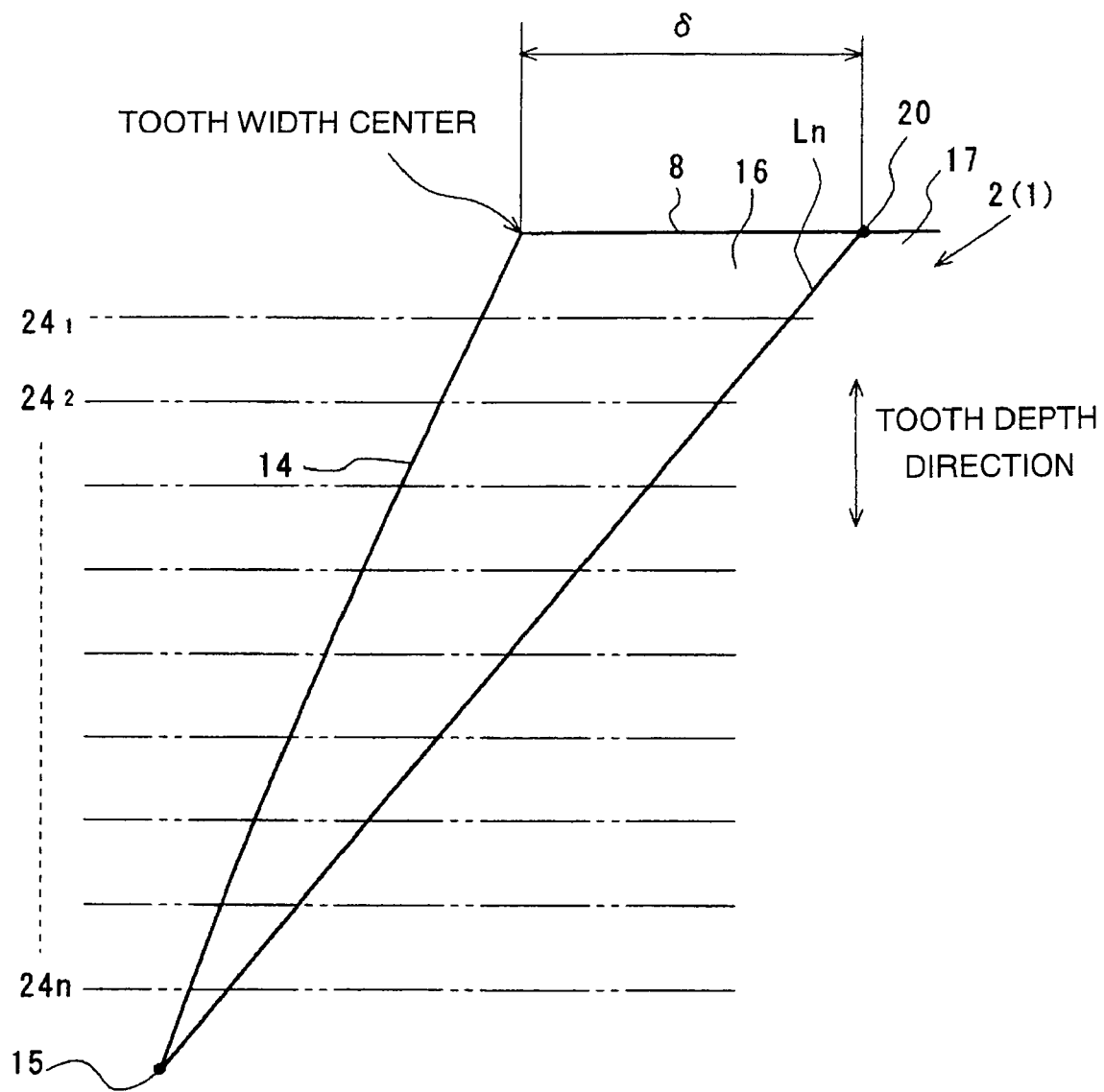
FIG. 15 is a diagram of a tooth profile shape in a tooth profile modification area shown divided in the tooth width direction of the tooth of the resin spur gear according to the fifth embodiment of the invention, corresponding to FIG. 4.
Figure 16:
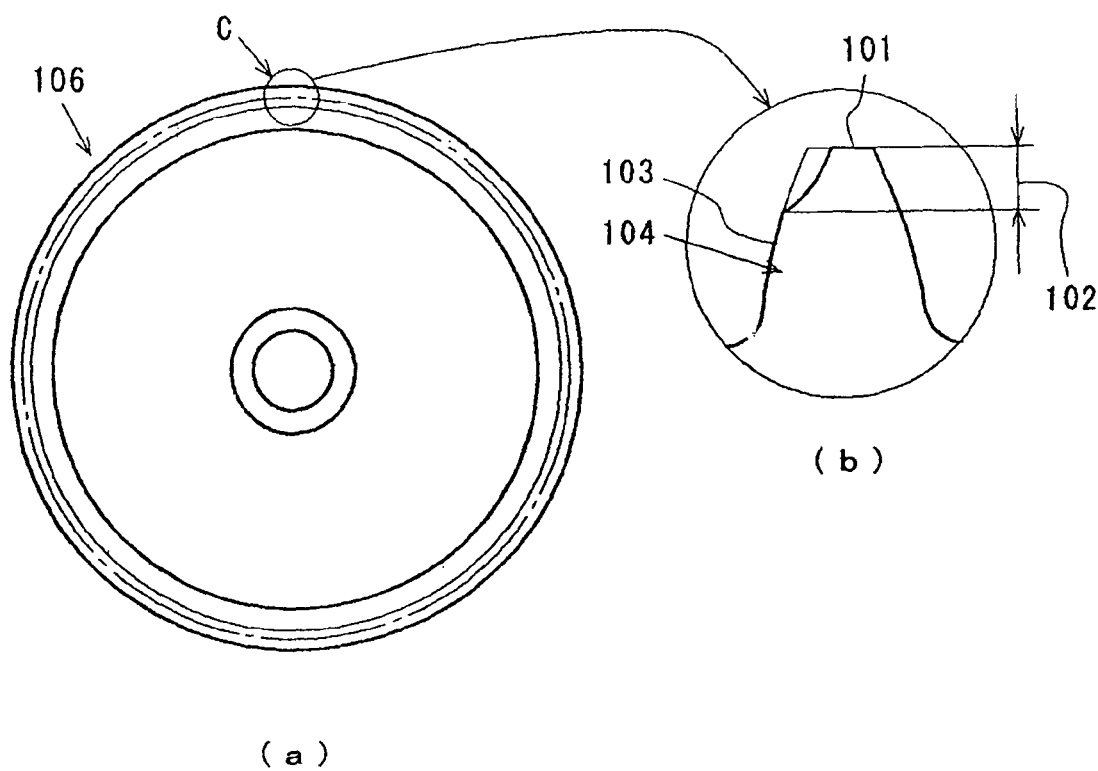
FIG. 16 is a front view of a conventional resin spur gear.
Figure 17:
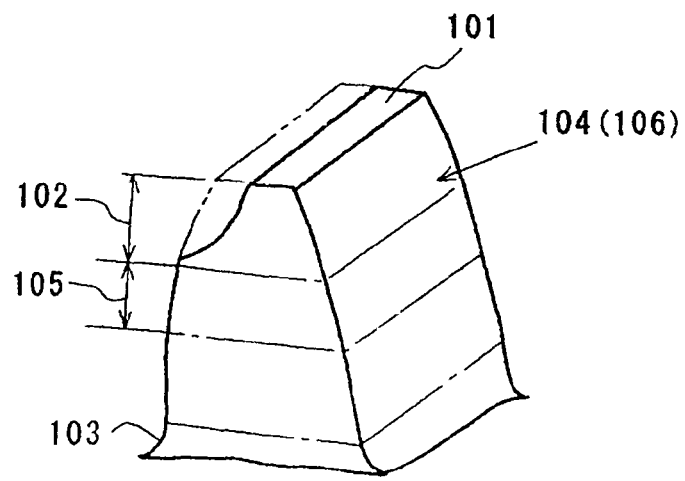
FIG. 17 is a perspective view of an outer appearance of a tooth on a conventional resin spur gear.

A resin spur gear 1 according to a fifth embodiment of the invention will be described with reference to FIG. 14 and FIG. 15. FIG. 14 is a diagram corresponding with FIG. 3 according to the first embodiment. FIG. 15 is a diagram corresponding with FIG. 4 according to the first embodiment. The resin spur gear according to the embodiment is a modified example of the resin spur gear according to the third embodiment. The arc R0 on the tooth crest 8 side end of the tooth 2 of the resin spur gear 2 according to the third embodiment is changed to straight lines L0 and L0. Constituent elements in the resin spur gear 1 according to the embodiment that are the same as those in the resin spur gear 1 according to the first embodiment are given the same reference numbers. Explanations that are the same as those according to the first embodiment are omitted.

The tooth profile modification area 11 of the tooth 2 on the resin spur gear 1 in the diagrams includes the linear standard profile portion 14 and the profile modification portion 16, as does the resin spur gear 1 according to the first embodiment. In the standard profile portion 14, the center 13 in the tooth width direction is formed by an involuted curved line from the tooth crest 8 to the involute profile area 12 side along the tooth depth direction. In the profile modification portion 16, the tooth thickness becomes thinner than the tooth thickness of the tooth surface of the involute tooth profile, gradually and smoothly decreasing from the standard profile portion 14 along the tooth width direction. In addition, the tooth thickness becomes thinner than the tooth thickness of the tooth surface of the involute tooth profile, gradually and smoothly decreasing from a tooth root side end (border with the involute profile area 12) 15 towards the tooth crest 8.

Next, a method for deciding the tooth surface shape in the tooth profile modification area 11 of the tooth 2 will be described.

First, tooth width direction end points 20 and 20 corresponding with a desired tooth crest modification amount d in the tooth width direction ends 17 and 17 of the tooth crest 8 are decided. Straight lines Ln and Ln connecting the tooth width direction end points 20 and 20 and the tooth root side end 15 are determined.

Next, in the tooth crest 8, a straight line L0 connecting (the center 13 in the tooth width direction and an intersection between the involute curved line and the tooth crest 8), and tooth width direction end points 20 and 20 on both tooth width direction ends 17 and 17 is determined.

Next, as shown in FIG. 15, the tooth profile modification area 11 of the tooth 2 is divided by the virtual planes $24_1$ to $24_n$ that are perpendicular to the tooth depth direction and run along the tooth trace. A straight line connecting the intersections between the straight lines Ln and Ln and tooth width direction ends 17 and 17 along the tooth trace on each division surface, and the standard profile portion 14 is determined. The convex curved surface forming the tooth surface 3 is formed by each straight line running along the tooth traces being smoothly connected along the tooth depth direction.

In the tooth profile modification area 11 of the tooth 2 on the resin spur gear 1 according to the embodiment, formed as described above, the shape of the cross-section of the tooth surface divided along the tooth width direction, perpendicular in the tooth width direction, is such that the curvature radius gradually increases from the center 13 in the tooth width direction towards the tooth width direction end 17, similar to the straight line Ln of the tooth width direction end 17.

The resin spur gear 1 according to the embodiment can reduce noise during rotative power transmission, as can the resin spur gear 1 according to the first embodiment. The rotation transmission can be accurately performed.

Other Embodiments

According to each embodiment described above, the tooth profile modification area 11 is formed only on one tooth surface side. However, the invention is not limited thereto. The tooth profile modification area 11 can be formed on both tooth surface sides.

According to each embodiment described above, the standard profile portion 14 is disposed in the center 13 in the tooth width direction. However, the invention is not limited thereto. The standard profile portion 14 can be disposed on one tooth width direction end 17 or between one tooth width direction end 17 and the center 13 in the tooth width direction.

According to each embodiment described above, the tooth profile modification area 11 is formed in one location along the tooth width direction. However, the invention is not limited thereto. A plurality of tooth profile modification areas 11 can be disposed along the tooth width direction.

According to each embodiment described above, the tooth profile modification area 11 is aligned with the two-pair meshing area K2. However, the invention is not limited thereto. The tooth root side end 15 of tooth profile modification area 11 can be disposed in a position closer to the tooth crest 8 side or the tooth root 10 side than the border between the two-pair meshing area K2 on the tooth crest 8 side and the one-pair meshing area K1.

The invention is not limited to the resin spur gear formed as shown in FIG. 1 and FIG. 2. The invention can be widely applied to generally-known resin gears of various configurations, such as a face gear a bevel gear, an internal gear pair, and a rack and a small gear having teeth with no torsion angle.

In the invention, the predetermined area on the tooth crest side is the tooth profile modification area. However, the invention is not limited thereto. The tooth profile modification area (a tooth profile modification area of which the contact surface area between the resin spur gear and the mating gear gradually increases from the tooth root side towards the tooth crest side) can also be formed in a predetermined area on the tooth root side.

INDUSTRIAL APPLICABILITY

The resin gear of the invention can be widely used in a gear train requiring quiet and accurate rotation transmission.

What is claimed is:

1. A resin gear having a plurality of teeth having no torsion angle, wherein:
   in a tooth, a tooth face that is a predetermined area from a tooth crest towards a tooth root side serves as a tooth profile modification area, and a tooth surface excluding the tooth profile modification area serves as an involute profile area,
   in which the tooth profile modification area has a tooth surface that is formed by smoothly connecting, in a tooth width direction, surfaces formed by a tooth profile cross-section obtained by equally dividing, in the tooth width direction, the tooth surface from a tooth width direction center to a tooth width direction end, so that the tooth profile modification area includes
   (1) a linear standard profile portion formed by an involute curved line from the tooth crest of the tooth towards the tooth root side and
   (2) a profile modification portion in which a tooth thickness continuously decreases from the standard profile portion along a tooth width direction and the tooth thickness continuously decreases from a tooth root end side towards the tooth crest;
   a contacting section becomes elastically deformed as a result of the resin gear coming into contact with a meshing mating gear, and (1) a tooth width direction length of the contact surface gradually increases from a minute width to a full tooth width from the tooth crest side towards the tooth root side, or (2) the tooth width direction length of the contact surface gradually decreases from the full tooth width to the minute width from the tooth root side towards the tooth crest side.

2. A resin gear according to claim 1, wherein said tooth profile modification area is divided into five equal portions (R0, R1, R2, R3, R4, R5) along the tooth width direction from a center of the tooth to an end of said tooth with the curvature of each of said five equal portions being set by the equations 1 through 4 below:

$$R1 = R0 - 1 \times \frac{(R0 - R5)}{5} \qquad \text{Equation 1}$$

$$R2 = R0 - 2 \times \frac{(R0 - R5)}{5} \qquad \text{Equation 2}$$

$$R3 = R0 - 3 \times \frac{(R0 - R5)}{5} \qquad \text{Equation 3}$$

$$R4 = R0 - 4 \times \frac{(R0 - R5)}{5}. \qquad \text{Equation 4}$$

* * * * *